US008195025B2

(12) United States Patent  
Branam et al.

(10) Patent No.: US 8,195,025 B2  
(45) Date of Patent: Jun. 5, 2012

(54) SYSTEMS, METHODS, AND COMPUTER PRODUCTS FOR DIGITAL VIDEO RECORDER MANAGEMENT AND SCHEDULING

(75) Inventors: Michael Branam, Lawrenceville, GA (US); Ke Yu, Alpharetta, GA (US); William Brown, Woodstock, GA (US); Oleg Kashapov, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1150 days.

(21) Appl. No.: 11/948,690

(22) Filed: Nov. 30, 2007

(65) Prior Publication Data

US 2009/0142036 A1 Jun. 4, 2009

(51) Int. Cl.  
*H04N 5/932* (2006.01)  
*H04N 5/935* (2006.01)

(52) U.S. Cl. ........................................ 386/219; 386/297

(58) Field of Classification Search ..................... 386/83, 386/219  
See application file for complete search history.

(56) References Cited

U.S. PATENT DOCUMENTS

| | | | | |
|---|---|---|---|---|
| 5,990,927 A * | 11/1999 | Hendricks et al. | ............ | 725/132 |
| 7,716,705 B2 * | 5/2010 | Berger et al. | ..................... | 725/58 |
| 7,907,164 B2 * | 3/2011 | Kenoyer et al. | ............ | 348/14.01 |
| 7,995,896 B1 * | 8/2011 | Comer et al. | ..................... | 725/88 |
| 2002/0054750 A1 * | 5/2002 | Ficco et al. | ..................... | 386/46 |
| 2004/0237104 A1 * | 11/2004 | Cooper et al. | ................... | 725/38 |
| 2006/0293077 A1 * | 12/2006 | Aaltonen et al. | .............. | 455/551 |
| 2007/0083895 A1 * | 4/2007 | McCarthy et al. | ............... | 725/46 |
| 2009/0132386 A1 * | 5/2009 | Natunen et al. | ................. | 705/26 |

* cited by examiner

*Primary Examiner* — Kambiz Zand  
*Assistant Examiner* — Dant Shaifer Harriman  
(74) *Attorney, Agent, or Firm* — Cantor Colburn LLP

(57) ABSTRACT

Systems, methods and computer products for DVR management and scheduling. In exemplary embodiments, a system is provided that includes DVR management and scheduling services including, but not limited to: DVR capacity indication; recorded and viewed programs indication; cancellation options for recorded and viewed programs; deletion priority for recorded and viewed programs; schedule change conflict resolution; DVR scheduling; remote and local DVR interface management; DVR searching and programming; multi-level DVR content searching, storage and management; search saving and favorite channel management; DVR management alerts and notifications; offsite DVR recovery; and DVR capacity provisioning.

13 Claims, 7 Drawing Sheets

| Remote DVR | | | | |
|---|---|---|---|---|
| 🔍Search  📋My Schedule  📀My Recordings  💾My Storage  👥My Account  ❓Help  Log out | | | | |

Title: Cash Cab
Unsuspecting New Yorkers get the opportunity to earn thousands of dollars when they hail an ordinary-looking taxi and answer questions correctly.

Details—
Starring:
Director:
Genre: Game Show
Rating

Options—
Series  ⊙ This episode only
       ○ The entire series
Stop recording  At Scheduled time ▾

Show type  ○ Frs run & rerun
          ○ First run only

Keep until  ⊙ Space needed
           ○ erase

[Update] [Delete] [Cancel]

| Title | Channel | Time | Edit |
|---|---|---|---|
| | 📺 11 DISCOV | Tue 4/17  5:30 PM–6:00 PM  30 min. | |
| Pussycat Dolls Present: The Search for the Next Doll – "The Fantastic Four" | 🌸 3 WUPA | Tue 4/17  9:00 PM–10:00 PM  60 min. | [Edit] [Delete] |
| Tonight Show With Jay Leno | 🌸 4 WXIA | Tue 4/17  11:35 PM–12:35 AM  60 min. | [Edit] [Delete] |
| Deadliest Catch – "Smoke on the Water" | 📺 11 DISCOV | Wed 4/18  3:00 PM–4:00 PM  60 min. | [Edit] [Delete] |
| Medium – "The One Behind the Wheel" | 🌸 4 WXIA | Wed 4/18  10:00 PM–11:00 PM  60 min. | [Edit] [Delete] |
| Dirty Jobs – "Turkey Farmer" | 📺 11 DISCOV | Wed 4/18  11:00 PM–12:00 AM  60 min. | [Edit] [Delete] |
| Tonight Show With Jay Leno | 🌸 4 WXIA | Wed 4/18  11:35 PM–12:35 AM  60 min. | [Edit] [Delete] |
| Tonight Show With Jay Leno | 🌸 4 WXIA | Thu 4/19  11:35 PM–12:35 AM  60 min. | [Edit] [Delete] |
| Raines – "Inner Child" | 🌸 4 WXIA | Fri 4/20  9:00 PM–10:00 PM  60 min. | [Edit] [Delete] |
| Tonight Show With Jay Leno | 🌸 | Fri 4/20 | [Edit] |

FIG. 4

| Title | Watched | Channel | Time | Edit |
|---|---|---|---|---|
| Around the Services | No | MILITARY 9 DSCMIL | Tue 4/17 4:02 PM–4:30 PM 27 min. | Edit / Erase |
| What I Like About You – "The Loft" | No | 3 WUPA | Tue 4/17 3:30 PM–4:00 PM 30 min. | Edit / Erase |
| What I Like About You – "When Holly Met Tina" | No | 3 WUPA | Tue 4/17 3:06–3:30 PM 23 min. | Edit / Erase |
| Judge Maria Lopez – "The Backyard Blowout" | No | 3 WUPA | Tue 4/17 2:18 PM–2:30 PM 11 min. | Edit / Erase |
| Life Today | No | 12 WHSG | Tue 4/17 2:17 PM–2:30 PM 12 min. | Edit / Erase |
| Days of Our Lives | No | 4 WXIA | Tue 4/17 1:36 PM–2:00 PM 23 min. | Edit / Erase |
| Tonight Show With Jay Leno | No | 4 WXIA | Mon 4/16 11:35 PM–12:50 AM 60 min. | Edit / Erase |
| Deadliest Catch – "A Tragic Beginning" | No | 11 DISCOV | Sat 4/14 5:00 PM–6:00 PM 60 min. | Edit / Erase |
| Tonight Show With Jay Leno | No | 4 WXIA | Fri 4/13 11:35 PM–12:50 AM 75 min. | Edit / Erase |
| Raines – "5th Step" | No | 4 WXIA | Fri 4/13 9:00 PM–10:00 PM 60 min. | Edit / Erase |

Page 1 of 5. 42 item(s) total. << Prev   Next >>

Legend

*FIG. 5*

SYSTEMS, METHODS, AND COMPUTER PRODUCTS FOR DIGITAL VIDEO RECORDER MANAGEMENT AND SCHEDULING

BACKGROUND

Exemplary embodiments relate generally to Internet Protocol Television (IPTV) and digital (personal) video recorders (DVR), and more particularly, to systems, methods and computer products for DVR management and scheduling services.

Internet protocol television (IPTV) is a digital television delivery service wherein the digital television signal is delivered to residential users via a computer network infrastructure using the Internet Protocol. Typically, IPTV services are bundled with additional Internet services such as Internet web access and voice over Internet protocol (VOIP). Subscribers receive IPTV services via a set-top box that is connected to a television or display device for the reception of a digital signal. Used in conjunction with an IP-based platform, the set-top box allows for a subscriber to access IPTV services and any additional services that are integrated within the IPTV service. In addition, DVRs can be coupled to the IPTV-enabled devices in order to record the content available from IPTV.

IPTV service platforms allow for an increase in the interactive services that can be provided to residential subscriber. As such, a subscriber can have access to a wide variety of content that is available via the IPTV service or the Internet. For example, a subscriber may utilize interactive services via a set top box to view IPTV content or access their personal electronic messaging accounts via an Internet web browser. The IPTV infrastructure also allows the delivery of a variety of video content instantly to the subscribers. Such content can be recorded on the subscriber's DVR.

Current DVR capability enables a subscriber to search for programs via an electronic programming guide (EPG) and to schedule recordings based on current and future programming, typically two weeks into the future. However, subscribers are given very little DVR management and scheduling capability with respect to options in handling DVR recording schedules.

BRIEF SUMMARY

Exemplary embodiments include systems, methods and computer products for DVR management and scheduling. In exemplary embodiments, a system is provided that includes DVR management and scheduling services including, but not limited to: DVR capacity indication; recorded and viewed programs indication; cancellation options for recorded and viewed programs; deletion priority for recorded and viewed programs; schedule change conflict resolution; DVR scheduling; remote and local DVR interface management; DVR searching and programming; multi-level DVR content searching, storage and management; search saving and favorite channel management; DVR management alerts and notifications; offsite DVR recovery; and DVR capacity provisioning.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 4 illustrates a screen shot of a DVR schedule user interface in accordance with exemplary embodiments;

FIG. 5 illustrates a screen shot of a DVR recordings user interface in accordance with exemplary embodiments;

The detailed description explains the exemplary embodiments, together with advantages and features, by way of example with reference to the drawings.

DETAILED DESCRIPTION OF EXEMPLARY EMBODIMENTS

Exemplary embodiments include systems, methods and computer products for DVR management and scheduling. In exemplary embodiments, a system is provided that includes DVR management and scheduling services including, but not limited to: DVR capacity indication; recorded and viewed programs indication; cancellation options for recorded and viewed programs; deletion priority for recorded and viewed programs; schedule change conflict resolution; DVR scheduling; remote and local DVR interface management; DVR searching and programming; multi-level DVR content searching, storage and management; search saving and favorite channel management; DVR management alerts and notifications; offsite DVR recovery; and DVR capacity provisioning.

Figure 1:
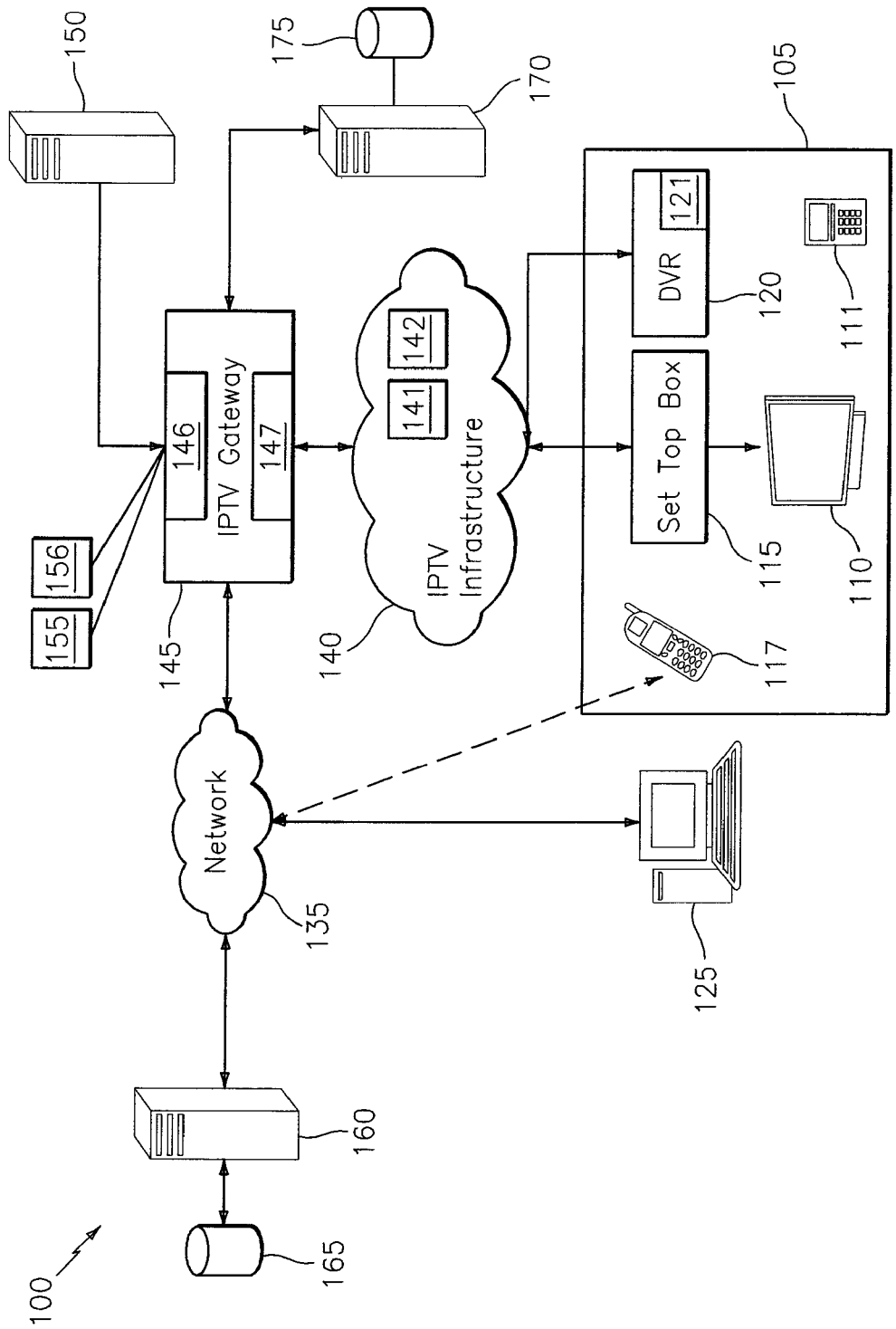
FIG. 1 illustrates a block diagram of an exemplary DVR management and scheduling system.

Turning now to FIG. 1, a block diagram of an exemplary DVR management and scheduling system 100 is now described. For case of illustration, the system 100 of FIG. 1 depicts a simplified network infrastructure. In addition, for ease of illustration, the system 100 is described implementing an Internet Protocol Television (IPTV) system for reception of programming and scheduling. It is understood that the systems and methods described herein can implement television and program-viewing systems other than IPTV. For example, the system 100 can implement cable, satellite and antenna.

Furthermore, it is understood that a variety of network components/nodes may be utilized in implementing the embodiment described herein. For example, in exemplary embodiments, the system 100 includes a means for accessing network services for multiple disparate devices using a single sign on procedure. Therefore, the system 100 manages accounts, each of which is established for a community of devices and/or device subscribers, such as those devices and subscribers in a subscriber location 105, which may include a communications device 110 (e.g., an IPTV-enabled television) coupled to a set top box 115. Where the communications device 110 is IPTV, the set top box 115 includes a processor that provides bi-directional communications between an IPTV infrastructure 140 and the communications device 110 and decodes the video streaming media received as content programming and onscreen programming information, from a content services provider server 160, discussed further below. Other services can be provided to the subscriber location, such as, but not limited to phone services, network services and other exemplary services such as the DVR management and scheduling services that can be implemented via the communications device 110. The accounts may thus include phone, network access and IPTV services and may be used to provide access to the DVR management and scheduling services as described further herein. Furthermore, in exemplary embodiments, one of the devices (e.g., the communications device 110) can be provisioned for the network services described herein by associating a device identifier of the communications device with a respective account. The account, in turn, identifies each of the communications devices belonging to the community and provides other information as described herein. Furthermore, it is appreciated that other devices such as a subscriber computer 125 can be further included in the community of devices established for the subscriber location 105. It is appreciated that the subscriber computer 125 can be local to the subscriber location 105 or can represent any other remote computer that can be used to access the services described herein. It is further appreciated that other remote devices can be implemented to access the services described herein such as but not limited to a cellular telephone (e.g., a 3G cell phone), a personal computer, a laptop computer, a portable computing device (e.g., personal digital assistant), and a digital music player (e.g., MP3 player), collectively represented as a device 117. As discussed further herein, a DVR management and scheduling services interface can be rendered on any of the above-referenced devices to implement the DVR management and scheduling services in accordance with exemplary embodiments.

In exemplary embodiments, one of the devices, such as the communications device 110 (and the set top box 115, in combination), can be used to establish account services, such as the DVR management and scheduling services described herein. An account record may be generated for the subscriber at the subscriber location 105, which identifies the subscriber and the account for which the services are provided (e.g., basic account services as described above and the DVR management and scheduling services described herein). Account information and records may be stored in a storage device accessible by an IPTV gateway 145, discussed below. In exemplary embodiments, the IPTV gateway 145 implements one or more applications for establishing and utilizing access to the DVR management and scheduling services account. Access to the DVR management and scheduling services account may thus be created for a community of communications devices (e.g., the communications device 10) to enable the communications devices to implement the DVR management and scheduling services as described herein. A preferences server 150, which is coupled to the IPTV gateway 145, includes preferences information for the subscriber location 105 as described further herein.

As discussed above, the system 100 of FIG. 1 includes the subscriber location 105, such as the subscriber's household. The subscriber location 105 can include the communications device 110 (e.g., an IPTV-enabled television) in communication with the set top box 115. The subscriber location 105 can further include a personal digital recorder such as a DVR 120, which is in communication with the communication device 110 and the set top box 115. It is understood that the set top box 115 and the DVR 120 may be two separate devices or be a single integrated device. In exemplary embodiments, the DVR 120 is hard-disk based, but may have other suitable storage media such as a cache, 121. It is appreciated that the DVR 120 can have other suitable memory devices for receiving and storing programming and scheduling data. Therefore, a "memory" or "recording medium" can be any means that contains, stores, communicates, propagates, or transports the program and/or data for use by or in conjunction with an instruction execution system, apparatus or device. The memory and the recording medium can be, but are not limited to, an electronic, magnetic, optical, electromagnetic, infrared or semiconductor system, apparatus or device. The memory and recording medium also include, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored. It is appreciated that the DVR 120 may be local on the set top box 115 (as described), or networked, or on an allocated media server storage space.

The subscriber location 105 can further include a remote control 111 for control and navigation of the communications device 110. As further described herein the remote control 111 can be implemented to navigate the DVR management and scheduling services interface. As discussed above, the subscriber location 105 can further include one or more remote devices in its community of devices. For example, the remote devices can include the remote subscriber computer 125. In exemplary embodiments, the remote subscriber computer 125 can be part of the subscriber location 105, or a computer that is accessed remotely in order to access the DVR management and scheduling services for control, management and scheduling of video content (e.g., content for recording on the DVR 120) from the content services provider server 160 to the subscriber location 105 for rendering on the communications device 110. It is therefore appreciated that access to the DVR management and scheduling services can be managed from a location remote to the subscriber location 105. It is understood by those skilled in the art that the remote subscriber computer 125 can include input and output devices, such as but not limited to a display, a mouse and a keyboard. Other devices that can access the DVR management and scheduling services include the device 117. As discussed further below, the aforementioned devices can all interact with the IPTV infrastructure 140 and the IPTV gateway 145. It is appreciated that any of the aforementioned devices can implement the DVR management and scheduling services. In exemplary embodiments, the communications devices herein can have a network address associated with the communications devices such as an addressable uniform resource locator (URL), and an Internet address.

The system 100 can implement the DVR management and scheduling services such that desired DVR control, management and scheduling can be managed and viewed through the subscriber's IPTV-enabled device, such as the communications device 110, via set top box 115, the remote devices (e.g., the remote subscriber computer 125, and the device 117) or other suitable device. As such, to coordinate IPTV communication, the system 100 may further include the IPTV gateway 145 that is in communication with the IPTV infrastructure 140. The IPTV infrastructure 140 and the IPTV gateway 145 are used in conjunction to communicate via a network 135. For example, a suitable device (e.g., the communications device 110, the device 117, and the remote subscriber computer 125) at the subscriber location 105 can implement the IPTV infrastructure 140 and the IPTV gateway 145 to communicate with the content services provider server 160 to access data from databases such as a database 165 (described further herein).

The network 135 can be an IP-based network for communication between the content services provider server 160 and the subscriber location 105 using communication devices such as but not limited to the communications device 110 (via the set top box 115, for example). The network 135 can be implemented to transmit content from the content services provider server 160 to the subscriber location 105 via a broadband connection, for example. In exemplary embodiments, the network 135 can be a managed IP network administered by a service provider. The network 135 can also be implemented in a wireless fashion, e.g., using wireless protocols and technologies, such as Wi-Fi, Wi-Max, etc. The network 135 can also be a cellular communications network, a fixed wireless network, a wireless local area network (LAN), a wireless wide area network (WAN), a personal area network (PAN), intranet, metropolitan area network, Internet network, or other similar type of network environment or other suitable network system and includes equipment for receiving and transmitting signals. In other exemplary embodiments, the network 135 can be a circuit-switched network such as a standard public switched telephone network (PSTN).

In exemplary embodiments, the IPTV infrastructure 140 can be an IP-based network that receives network data (e.g., programming content for recording on the DVR) from the content services provider server 160 and the preferences server 150, and delivers the network data to the set top box 115 for display or other rendering on the communications device 110. Alternatively, the network data can be for display or rendering on the remote subscriber computer 125 or other suitable device, such as device 117.

In exemplary embodiments, as discussed above, the IPTV infrastructure 140 provides an interface between the subscriber location 105 and the IPTV gateway 145. In exemplary implementations, a notification server 141 and a terminal server 142 operate to interface communication between the subscriber location 105 via the set top box 115, and the IPTV gateway 145. For example, in exemplary implementations, the set top box 115 can provide a unique identification number so that the IPTV gateway 145 can route the network data to the set top box 115. In doing so, a message is passed between the notification server 141 and the set top box 115. Furthermore, the IPTV gateway 145 provides an interface between the content services provider server 160, and the IPTV infrastructure 140 and subscriber location 105. In exemplary embodiments, the IPTV gateway 145 handles notifications to the IPTV subscriber location 105 and can further provide a history of the notifications. A DVR management and scheduling services application 155 can reside partially or wholly on the IPTV gateway 145 to handle the notifications as further described herein. In exemplary embodiments, the DVR management and scheduling services application 155 can further reside partially or wholly on the set top box 115. When the subscriber sets up his/her DVR management and scheduling services on the communications device 110 (or other device in the subscriber location 105, remote device, such as the subscriber computer 125 and device 117), one of the network components of the system 100 (e.g., the set top box 115, or the IPTV gateway 145.) can store specific scheduling information that the subscriber has created. For example, as discussed further herein, each subscriber can access and manipulate viewing and recording information for the DVR 120 via an interface. As such, if the interface is stored on the IPTV gateway 145, messages and notifications can be passed between the subscriber location 105 and the IPTV gateway 145 that include present scheduling and historic scheduling that the subscriber has created in the past. Furthermore, if any changes in the subscriber's scheduled recordings have occurred, messages can be passed to the subscriber location 105 (or remote device) to notify the subscriber that a program scheduled to be recorded on the DVR 120 has changed. The subscriber can make changes accordingly.

In exemplary embodiments, the IPTV gateway 145 can further interface with the various system 100 elements as described herein. For example, the IPTV gateway 145 is in communication with the preferences server 150 to pass notifications and messages (e.g., Email messages) regarding permissions to create and edit DVR management and scheduling information. For example, different members of the subscriber location 105 who share account services may have different recording schedules. For example, one member may have a first unique recording schedule and another member may have a second unique recording schedule with little to no overlap with the first recording schedule. As such, each member can retrieve and edit those different schedules and be properly authenticated to retrieve and edit those schedules.

In exemplary embodiments, the IPTV gateway 145 can include a back end 146 and a front end 1417. The front end 147 can be used to implement various provisioning activities such as but not limited to initial provisioning of IPTV addresses for the devices at the subscriber location 105. The back end 146 can be implemented for many of the DVR management and scheduling services, such as communicating with the content services provider server 160 and retrieving scheduling and programming data from the database 165, and passing messages and notifications to the IPTV gateway 145. As such, the back end 146 can include various elements including but not limited to a caller ID handler, SMS handler, message handler, and provisioning handler.

In exemplary embodiments messages and notification can be sent between the IPTV gateway 145 and the subscriber location 105. In exemplary embodiments, the messages and notifications can be implemented via an email message. In exemplary embodiments, the IPTV gateway 145 is responsible for retrieving email messages that have been sent to an IPTV subscriber and providing notification of the reception of the email message to the IPTV subscriber at the subscriber location 105. A notification can be in the form a "pop-up" display window displayed at a suitable device (e.g., the communications device 110) or any other conventional message notification scheme. As discussed above, the IPTV gateway 145 can present a history of the notifications to the IPTV subscriber.

In exemplary embodiments, IPTV gateway 145 interfaces with a POP3 infrastructure in order to retrieve email messages that have been directed to an IPTV subscriber. Additionally, the IPTV gateway 145 can interface with the preferences server 150. As described herein, the preferences server 150 is responsible for handling the performance preferences for the system 100 as dictated by the desires of an IPTV subscriber. Further, the IPTV gateway 145 is responsible for retrieving an IPTV subscriber's preferences for the set top box 115.

In exemplary embodiments, the IPTV gateway 145 interacts with the IPTV infrastructure 140 to accomplish the actual transmittal of the email message to the set top box 115. Further, all email notifications that are generated within the system 100 are saved to a log at the IPTV gateway 145. In exemplary embodiments, the subscriber can view a listing of the received email message log on their display device via an application that runs on the set top box 115.

In exemplary embodiments, the front end 147 can include a message center application that is in communication with a message center enterprise java bean (EJB) and an email handler that are included within the back-end 146. The IPTV infrastructure 140 is provisioned with the subscriber user account numbers and the set top box 115 identifiers. In exemplary embodiments, the IPTV gateway 145 includes a telephone number-to-account number mapping component, wherein a provisioned telephone number correlates to the IPTV subscriber's primary household telephone number (e.g., to the device 117). The IPTV subscriber's telephone number is further associated with the IPTV subscriber's email address. Further, the telephone number and email address are linked with the subscriber's IPTV account number through a web-provisioning interface that is available within the IPTV gateway 145. The IPTV gateway 145 has the ability to retrieve email messages and any image or audio/video attachments to the message, wherein the messages and the attachments are displayed as notifications on the communications device 110.

In exemplary embodiments, the subscriber is provisioned a primary email account. The email account is associated with the telephone number of the IPTV subscriber's primary household telephone number (e.g., the local part of the subscriber's email address can comprise the primary household telephone number). The primary email account is configured to auto-forward all received email messages to a secondary email account that can be serviced by an email server. After being forwarded to the secondary email account, the email message can be configured to be deleted from the sending primary email account.

At predetermined time intervals, the back-end 146 periodically polls the email server to ascertain if the email server has received any new email messages. The back end 146 can include a POP3 reader thread, which is configured to periodically read a POP3 mailbox that has been configured to receive IPTV email messages. The back-end 146 can retrieve new email messages from the email server. For each retrieved email message, the back-end 146 saves the text of the email message, and if attached, the first image file attachment to an email log. The IPTV gateway 145 can transmit a notification to the subscriber location 105 that an email message has been received. The IPTV gateway 145 stores the received email message information, thus allowing the IPTV subscriber to retrieve the email message information at a later time period with the use of the message center application. As described herein, messages and notifications can be implemented for a variety of purposes related to the DVR management and scheduling services described herein. For example, notifications can be sent to the subscriber household related to scheduling in which the subscriber may be interested, scheduling conflicts within the subscriber's recording schedule, and capacity issues with the DVR 12, as further described herein.

In exemplary embodiments, the IPTV gateway 145 may implement authentication using a high-speed processing device (e.g., a computer system) that is capable of handling high volume activities conducted via communications devices, and other network entities (e.g., parts of the IPTV infrastructure 140, network 135, etc.) via one or more networks (e.g., the IPTV infrastructure 140). The IPTV gateway 145 receives requests from one or more devices from the subscriber location 105 to access network services, such as the DVR management and scheduling services. The IPTV gateway 145 may implement authentication software for restricting or controlling access to network. The IPTV gateway 145 may be in communication with a customer identity system (CIS) database, which stores subscriber credentials (e.g., subscriber names and passwords) established via the DVR management and scheduling services account.

In exemplary embodiments, the IPTV gateway 145 can further be in communication a DVR management server 170, which is coupled to a DVR management database 175. The DVR management server 170 and database 175 can be implemented to provide enhanced management services that are currently not available with current DVR scheduling. For example, some network data previously obtained from the content services provider server 160 may no longer be stored on the content services provider server 160 or in the database 165. Current content providers typically only provide current programming data and programming data into a short period in the future (e.g., two weeks). However, as further described herein, the enhanced DVR management and scheduling services can provide long term content storage, which may include metadata about the content that the content services provider server 160 no longer provides. The DVR management server 170, however, can include databases such as the database 175 that includes historic data, such as metadata that describes shows that have been previously recorded, thereby providing the stored metadata anytime the subscriber wants to access content that has been recorded and stored long after the content services provider server 160 typically provides the data. The subscriber may not have viewed the recorded programs for a time period that has exceeded a time prior for which the content services provider server 160 would store the descriptive information about the show. However, the DVR management server 170 stores the information in the database 175 for time periods longer than those time periods offered by the provider of the content services provider server 160, in accordance with exemplary embodiments. In this way, the subscriber still has access to descriptive information about previously recorded shows. As such, the DVR management server 170 can be accessed by the IPTV gateway 145 upon a determination that a data request by the subscriber location 105 is not available from the content services provider server 160.

In exemplary embodiments, the system 100 can further include the DVR management and scheduling services application 155 that can reside on the IPTV gateway 145, as mentioned above. In exemplary embodiments, the DVR management and scheduling services application 155 can be implemented by the subscriber to access and set up an interface application 156 to implement the DVR management and scheduling services application 155. The interface application 156 can be implemented to locally or remotely search for and schedule programs on the DVR 120. The interface application 156 can further be implemented to access account information from the IPTV gateway 145 and the preferences server 150. The interface application 156 can further be implemented to manage cancellation and deletion of programs and search saving and favorite channel management. The interface application 156 can further be implemented to access data from the DVR management server 170 as described herein. In exemplary embodiments, the DVR management and scheduling services application 155 can include pointers to the content services provider server 160 for accessing scheduling information and for directing content to be recorded on the DVR 120. The pointers, in turn, provide access to the schedules stored in the database 165 for streaming to the subscriber's set top box 115 for rendering on the interface application 156. The interface can further be implemented to manage and coordinate other DVR services such as off-site DVR content recovery and DVR capacity provisioning as further described herein. The interface application 156 is shown as residing on the IPTV gateway 145. It is appreciated that the interface application 156 can reside on the set top box 115. In further embodiments, the interface application 156 can reside partially on the IPTV gateway 145 and partially on the set top box 115. As further described below, the interface application 156 be implemented to store scheduling and recording data such that a subscriber can access the data via an interface displayed on a device such as the communications device 110.

In exemplary embodiments, the interface application 156 also provides access to the IPTV gateway 145, such that messages and notifications can be passed between the subscriber location 105 and the IPTV gateway 145 that include present scheduling and historic scheduling that the subscriber has been created in the past. Furthermore, if any changes in the subscriber's scheduled videos have occurred, messages can be passed to the subscriber location 105 (or remote device) to notify the subscriber that a program scheduled to be viewed has changed. The subscriber can make changes accordingly.

In exemplary embodiments, as discussed above, the system 100 further includes the content services provider server 160, which is in communication with the IPTV gateway 145 via the network 135. In exemplary embodiments, the content services provider server 160 is implemented by a host system (e.g., a high-speed processing device) that provides content to its subscribers (e.g., a subscriber of the communications device 110), such as television programs, premium programming services, video on demand content, and Internet/Web content (e.g., podcasts, and streaming media). In exemplary embodiments, the content is transmitted to the subscribers (e.g., at subscriber location 105) via a broadband connection over an Internet Protocol (IP)-based network (e.g., network 135). The content services provider server 160 can also provide an onscreen programming guide (e.g., EPG) to customers (e.g., the subscriber of the communications device 110) that provides information about current and future programming available via the content providers' services. Programming information provided by the onscreen programming guide may include current and future program listings including program titles, primary actors/actresses, begin time, duration of program, a year in which the program was produced, and a brief text description of the program.

In exemplary embodiments, the content services provider server 160 is coupled to the database 165. In a one implementation, the database 165 may be representative of a given play list. A play list is associated with a particular program screen. For example, a play list can be generated for a given screen that is displayed for a view on the communications device 110. As a subscriber is browsing through different channels, and therefore different program content, as each new channel and program content are displayed on the communications device 110, a different play list is accessed by the communications device 110 from the content services provider server 160, which can be via set top box 115. In exemplary embodiments, play lists can include programming content, as well as programming schedules for the content (e.g., onscreen programming guide information (EPG)). In exemplary embodiments, the database 165 stores records of programming events scheduled for transmission to customers via a communications device, such as the communications device. These records, in turn, can be used in conjunction with the DVR 120 in order to schedule recordings.

In exemplary embodiments, upon a request from the subscriber location 105, the IPTV gateway 145 can coordinate obtaining the acquired data from the database 165 and provide the acquired data for display and rendering at the subscriber location 105. It is appreciated that the coordination of acquiring the data and ultimately displaying the data on the communications device 110 (or other device) is implemented via the DVR management and scheduling services application 155. Furthermore, according to exemplary embodiments, the DVR management and scheduling services application 155 coordinates the transfer of the program data from the database 165 such that the DVR management server 170 also receives the data for storage on the database 175. As described herein, the DVR management server 170 and the database 1775 are implemented for long-term storage of the data that may not be available from the content services provider server 160 and the database 165.

In exemplary embodiments, upon a request from the subscriber location 105, the IPTV gateway 145 can coordinate obtaining the video from the database 165 and provide the acquired data (e.g., playlists and selected videos) for display and rendering at the subscriber location 105. As described, the coordination of acquiring the data and ultimately displaying the data on the communications device 110 (or other device) is implemented via the DVR management and scheduling services application 155. Furthermore, the DVR management and scheduling services application 155 may coordinate the transfer of the program data from the database 165 for rendering on the communications device 110.

In exemplary embodiments, the system 100 can further provide off-site DVR recovery. It is appreciated that under certain circumstances, the DVR 120 may lose its content, such as due to a hard drive failure. As such, in exemplary implementations, the subscriber can store all recorded DVR content to an offsite location. The offsite location can be provided by the content provider or by the subscriber's services provider. As such, the offsite location can be included as part of the content server 160, such as via the database 165. The offsite location can further be provided by the DVR management server 170, such as via the database 175. It is appreciated that the offsite location can further be provided by the IPTV gateway 145 or by any variety of databases and server coupled to the network 135 or the IPTV infrastructure 140. In exemplary embodiments, the DVR 120 can be backed up to the offsite location automatically as part of the DVR management and scheduling services. In other exemplary embodiments, the subscriber can periodically back up the DVR 120 to the offsite location, such as via the DVR management and scheduling services application 155. As such, the DVR management and scheduling services interface application 156 can provide the subscriber with an option to back up the DVR 120 at the subscriber's discretion. In exemplary embodiments, in the event of failure of the DVR 120 (or a replacement of the DVR 120) in which the subscriber loses DVR content from the DVR 120, once the subscriber has replaced the DVR, the subscriber can recover the DVR management and scheduling services account to access the DVR management and scheduling services application 155. Upon successfully recovering the DVR management and scheduling services account, the subscriber can implement the DVR management and scheduling services application 155 to rebuild the DVR 120. The subscriber can thus access the offsite location and recover the stored DVR data from the offsite location and download the data to the DVR 120.

In exemplary embodiments, the DVR 120 recovery can be performed by network availability of popular shows. For example, in lieu of an active back up of the DVR 120, the subscriber can rely upon the availability of popular shows and programs that may be stored in the system 100. For example, the content services provider server 160 may have access to a database, such as the database 165 that keeps an ongoing storage of popular shows indefinitely. It is appreciated that several servers and databases may be available on the network 135, which the subscriber can access in the event of a failure or replacement of the DVR 120. As such, once the subscriber has recovered the DVR management and scheduling services account, the subscriber can implement the DVR management and scheduling services application 155 to perform a search of the network 135 for the availability of popular shows that is consistent with shows and programs that the subscriber had previously stored on the DVR 120. It is appreciated that the DVR management and scheduling services application 155 would have stored at least some data associated with the previously recorded shows, such as via pointers to the content services provider server 160 and the database 165 and to the DVR management server 170 and the database 175.

In exemplary embodiments, the system can further provide DVR capacity provisioning. As discussed above, the DVR 120 can be hard-disk based, but may have other suitable storage media such as the cache 121 or other suitable memory devices for receiving and storing programming and scheduling data. In exemplary embodiments, when the subscriber receives the DVR 120 from the respective provider, the DVR can have a specific amount of disk space provisioned, for example 25%. As the subscriber uses up disk space, the subscriber can opt to "un-lock" further disk space on the DVR 120. In exemplary embodiments, the DVR 120 can periodically send a message to the IPTV gateway 145, which indicates the present capacity of the DVR 120. Alternatively, the system 100 can periodically poll the DVR 120 to ascertain the present state of the capacity. In exemplary embodiments, when the DVR 120 has reached a pre-set capacity, the IPTV gateway 145 can send a message or notification to the subscriber location (e.g., the communications device 110, the device 117 or the subscriber computer 125) to notify the subscriber that the capacity has reached a certain threshold and that additional disk space is available. The message is sent as described above. As such, the subscriber can opt to unlock additional disk space on the DVR 120 via a massage. It is appreciated that a fee could be associated with the additional disk space provisioning. In exemplary embodiments, the subscriber can check the capacity status via the interface application 156 as described further herein with respect to FIG. 6.

Figure 2:
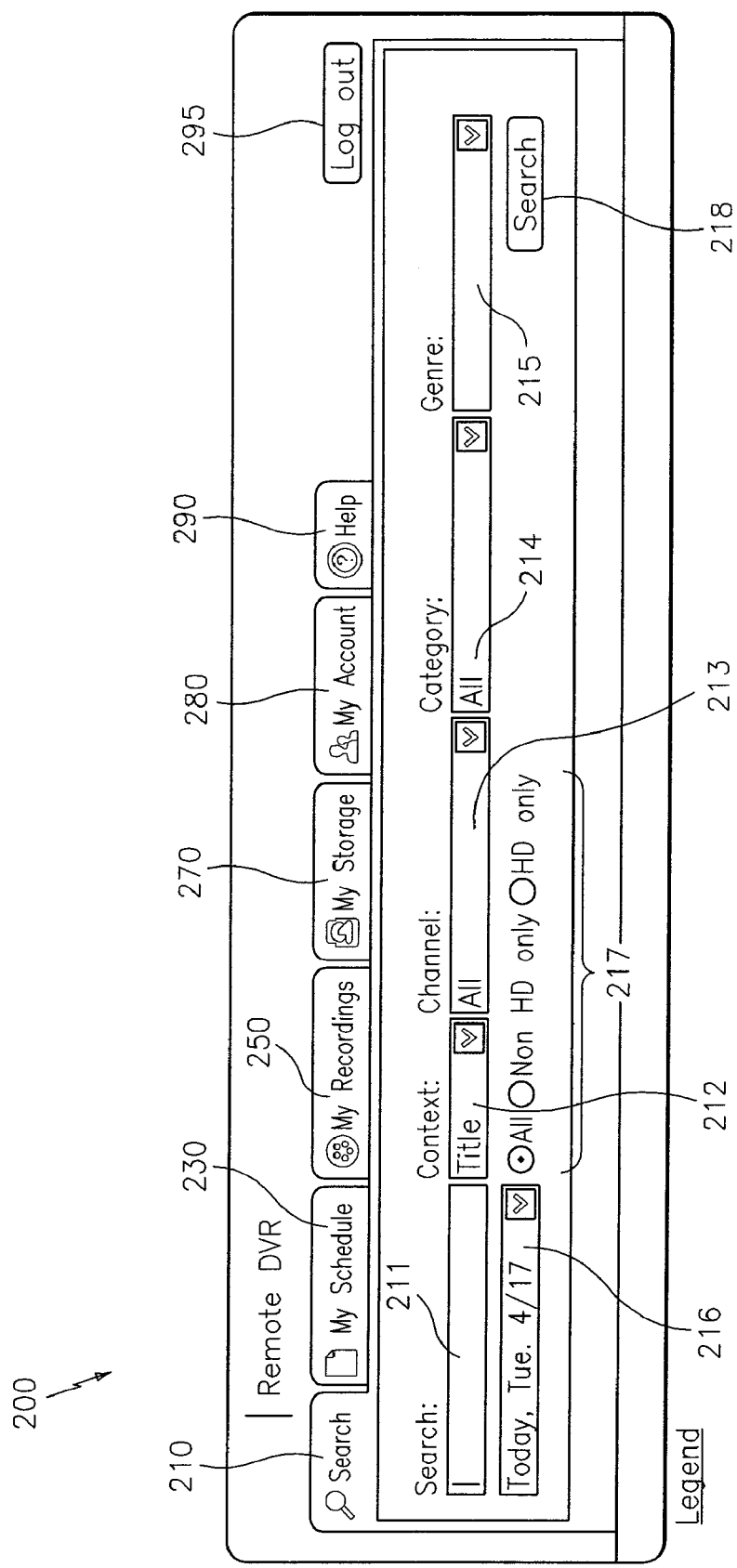
FIG. 2 illustrates a screen shot of an exemplary DVR search user interlace.

As described herein, the system 100 includes the DVR management and scheduling services interface application 156 to implement the DVR management and scheduling services. FIG. 2 illustrates a screen shot of an exemplary DVR search user interface 200 that can be displayed on a suitable device (e.g., the communications device 110). In exemplary embodiments, the interface 200 can include multiple tabs 210, 230, 250, 270, 280, 290 that can be implemented to navigate a subscriber to multiple screens for a multiplicity of DVR management and scheduling services. The search tab 210 provides an interface in which the subscriber can search for programs to record on the DVR 120. The schedule tab 230 provides an interface in which the subscriber can implement DVR schedule options. The recordings tab 250 provides an interface in which the subscriber can manage recordings that have already been made. The storage tab 270 provides an interface that provides the subscriber with the state of the capacity of the DVR 120. The account tab 280 provides an interface in which the user can manage account options. According to exemplary embodiments, the account tab 280, when selected, can navigate the subscriber to an interface in which account services can be managed. For example, the subscriber can manage user names and passwords, emails and other demographic information. In addition, certain events can be entered such that the subscriber is informed via a message or notification (as described further herein). For example, when the disk space available on the DVR 120 reaches a certain threshold, a notification can be sent to the subscriber. The subscriber can further enter preferences for notifications, such as indicating where notifications are to be sent (e.g., the communications device 110, the device 117 and the subscriber computer 125). The help tab 290 provides an interface with help options such as contact information for customer service, frequently asked questions, update information and version information. The interface 200 further includes a logout button 295 so that the subscriber can navigate from the interface 200 when complete.

Referring still to FIG. 2, the interface 200 illustrates multiple search option capabilities. In exemplary embodiments, the interface 200 includes a free-form search field 211, in which the subscriber can enter search terms. In exemplary embodiments, the interface 200 includes a context field 212, in which the subscriber can enter a specific context via a pull-down menu, for example. The context field 212 can include title, actor, director or other suitable contexts. As such, it is appreciated that the subscriber can significantly narrow down the search data that is returned to the interface 200. The interface 200 can further include a channel field 213, in which the subscriber can search by channels only. The interface 200 can also include a category field 214 to further narrow the search. The category field 214 can include a pull-down menu to display categories of programs to be searched such as but not limited to movies, documentaries, news, musicals and sitcoms. The interface 200 can further include a genre field 215 that can include a pull-down menu to display various genre categories including but not limited to drama, comedy and science fiction. In exemplary embodiments, the subscriber can search by date. As such, the interface 200 can further include a date field 216. In exemplary embodiments, the search criteria can also be limited by whether or not the programs associated with the search data are high-definition (HD) or non-HD. Therefore, the interface 200 can further include a data field 217 in which the subscriber can specify whether to return HD, non-HD or both HD and non-HD (e.g., All). Once the subscriber has selected the desired search criteria, the subscriber can press a search button 218 to have data returned to the interface 200. In exemplary embodiments, the search request is sent to the content services provider server 160 via the IPTV gateway 145 and data is returned to the subscriber location 105 from the database 165.

Figure 3:
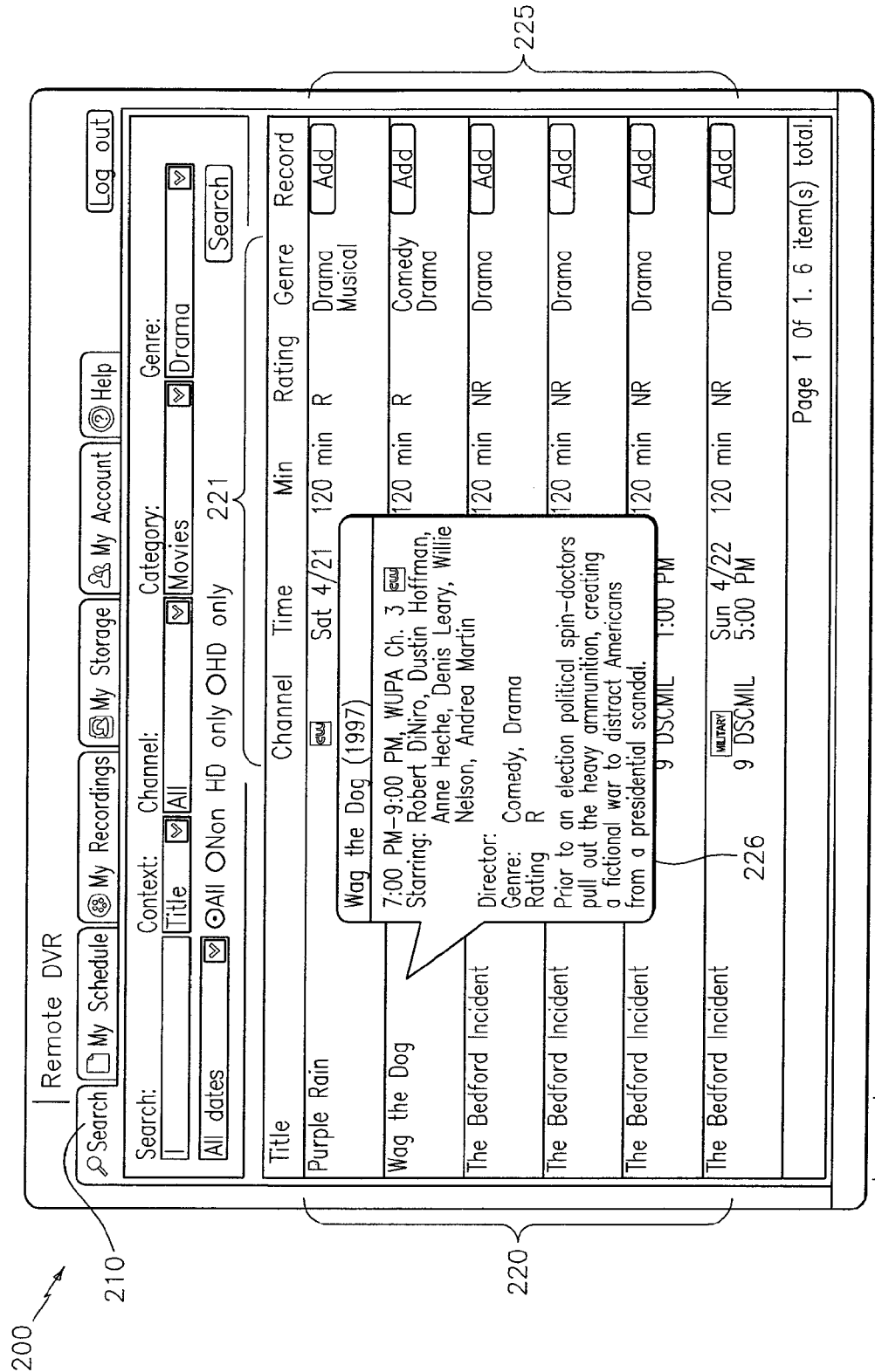
FIG. 3 illustrates another screen shot of a DVR search user interface in accordance with exemplary embodiments.

FIG. 3 illustrates another screen shot of the DVR search user interface 200 in accordance with exemplary embodiments. Once the subscriber has entered the desired criteria and pressed the search button 218 as described above, the data is returned to the interface 200. In this example, the subscriber as entered data for a "movies" category with a "drama" genre. The data that is returned includes a listing of movies 220 as well as a series of descriptive columns 221 having information including channel, time, running time, rating and genre. Furthermore, the interface includes "add" buttons 225 in which the subscriber can press to add to a recording schedule interface, such as a DVR schedule user interface 231 illustrated in FIG. 4. In exemplary embodiments, the subscriber can view information about the program. For example, the subscriber can select one of the programs from the listing of movies 220, (e.g., using the remote control 111 associated with the communications device 110). When the listing is selected, an informational screen 226 can be displayed, which includes information about the selected program. In exemplary implementations, the informational screen 226 can be generated by loading the program data using a program that does not interfere with the loading of the interface 200 (e.g., asynchronous javascript and XML (AJAX)).

In exemplary embodiments, in order to schedule a program for recording, the subscriber presses the add button 225 associated with the desired program. According to exemplary embodiments, the program listings 220 display the earliest possible recording time to the subscriber, given currently scheduled programs and bandwidth. As discussed above, the system 100 recognizes specific category information such as genre. In exemplary embodiments, the subscriber can input pre-set category information into the systems (e.g., via the preferences server 150). For example, the subscriber can configure the interface 200 to record all "News" programs in SD while preserving bandwidth and storage required for HD for movies and preferred television series. In exemplary embodiments, the subscriber can therefore store preferences based on preferences such as but not limited to favorite categories, or category specifics, favorite channels, and specific search criteria. In addition, as described further herein (see FIG. 6 below), an interface can be provided to graphically depict storage available by content type (and other categories).

In exemplary embodiments, when the subscriber selects a program of interest (e.g., from the EPG), the system 100 (e.g., via the content services provider server 160) presents a list of potential recording times for the program. FIG. 3 illustrates, for example, four possible recording times for "The Bedford Incident". As discussed above, the list can be presented based on the subscriber's preferences (e.g., display only HD times for movies). The system 100 therefore searches for all titles in the returned data. The system 100 further checks to ascertain whether or not there is a scheduling conflict. If there is no conflict, then the program is scheduled, which includes matching the media format with the genre preferences established by the subscriber, and ensuring that bandwidth requirements are met. Once the program is scheduled, then any data returned by the system 100 in future searches reflects the current schedule. In exemplary embodiments, existing scheduled programs are refreshed ensuring that any changes to existing programs are reflected.

If there is a scheduling conflict with the currently scheduled program to be recorded, then the system may provide conflict resolution. In exemplary embodiments, the subscriber is notified of a conflict that may arise when schedules of such programs change (e.g., via messages and notifications as described herein). In exemplary embodiments, the system 100 displays an alert on the television screen letting the subscriber know that there is a recording conflict that has arisen (e.g., a current movie programming request conflicts with an ongoing series recording), and gives the subscriber the option to resolve the conflict (e.g., record one show in favor of another in case of conflict). The resolution alert/dialog may appear when the interactive program data information first changes, or it may be displayed as soon as the user accesses the system 100. The alert/dialog may appear periodically if the user has yet to respond to the conflict.

In exemplary embodiments, if there is a scheduling conflict, a prioritized list is presented based on the subscriber profile including, but not limited to: media format that matches genre preferences listed in the subscriber preferences; bandwidth limitations during the recording time; and re-ordering options to accommodate the desired recording. In exemplary embodiments, if it is not possible to record a particular program based on the current schedule, previously scheduled programs are removed to offer a schedule that successfully captures all programs in the earliest possible order. In exemplary embodiments, if it is not possible to reschedule a program to resolve the conflict, then the system 100 provides options that require the removal of an existing program in favor of the new desired program.

As discussed herein, the subscriber can receive requested programming data. In exemplary embodiments, all daily data can be provided from the content services provider server 160 to a device accessible by the subscriber (e.g., the IPTV gateway 145). In turn, each time the subscriber performs a search based on the daily data, the searched data can be stored in a local cache, such as in the cache 121. Once received, the subscriber can sort and schedule based on this stored data daily and on a search-by-search basis. For example, once the data is cached, it is readily available for search modifications based on different criteria. As such, the subscriber can sort the cached data by channel, by genre or any of the other categories in the descriptive columns 221 as described above. In exemplary embodiments, the searchable daily data can be pre-indexed XML data stored in a structured query language (SQL) database in the local cache 121. In exemplary embodiments, the DVR management and scheduling application 155 can be a web-based application having a browser. As such, it is appreciated that the device onto which the subscriber displays the interface 200 (e.g., the communications device 110, the device 117 and the subscriber computer 125) can be a device that is capable of supporting a web browser to search the daily data from the cache 121.

Furthermore, as described above, scheduling data is maintained by the content services provider server 160 on a periodic basis, which is longer than a single day (e.g., two weeks). It is appreciated that the periodic data can be cached on a daily basis as well as described above. In exemplary embodiments, once data has been cached, once the subscriber begins to type search criteria into a search field (e.g., the free form search field 211), partial matches are displayed in the search field, thereby enabling the subscriber to select from previously cached search criteria. In this way, it is appreciated that by organizing data in the cache 121, search content can be narrowed. In exemplary embodiments, the interface 200 can further include a "save search" feature in which the subscriber can save search criteria that the subscriber often enters.

As further described herein, the DVR management server 170 and database 175 can be implemented to provide enhanced management services that are currently not available with current DVR scheduling. As described above, the enhanced DVR management and scheduling services can provide long term content storage, which may include metadata about the content that the content services provider server 160 no longer provides. The DVR management server 170, however, can include databases such as the database 175 that includes historic data, such as metadata that describes shows that have been previously recorded, thereby providing the stored metadata anytime the subscriber wants to access content that has been recorded and stored long after the content services provider server 160 typically provides the data. It is therefore appreciated that the system 100 provides multi-level storage and content searching capability, based not only on daily storage and search caching, but also based on several weeks as provided by the content services provider server 160 and based on several months as provides by the DVR management server 170.

As described above, the subscriber can add selected programs to the subscriber schedule using the add buttons 225, thereby generating a subscriber schedule that the subscriber can view, edit and manage as now described.

FIG. 4 illustrates a screen shot of the DVR schedule user interface 231 in accordance with exemplary embodiments. As described above, the interface 200 includes multiple tabs (that are present in each interface to which the subscriber navigates) including the schedule tab 230 that, when navigated, displays the schedule interface 231. In exemplary embodiments, the interface 231 can display a list of programs 232 that the subscriber has selected for recording on the DVR 120. The interface 231 can further include as a series of descriptive columns 233 having information including title, channel and time recorded/running time. The interface 231 can further include an edit button 237 for opening up a particular program listing for review and edit. The interface 231 can further include a delete button 234 to delete the program. As described above, the subscriber can select to edit a program by pressing the edit button 237. When the subscriber presses the edit button 237, the program listing associated with the pressed edit button 237, expands to a viewing field 235, in accordance with exemplary embodiments. The viewing field 235 can include information about the program such as description, actors, genre and other data. The viewing field 235 can further include edit field options. In the example shown, a series has been recorded (and in the process of being recorded). The subscriber is given a series options field 236 into which the subscriber can select to record particular episodes or an entire series of the episodes, in which case the DVR 120 records each instance of the series as it occurs in the program listings provided by the content services provide server 160, for example. However, the subscriber also has the option to enter whether to record first runs or first runs and reruns in a show type options field 237. As such, the DVR 120 records the selected series but only dependent on whether it is a first run or a rerun. Furthermore, the subscriber has the option to keep the particular recordings dependent on a "keep until" options field 238. As such the subscriber can control whether or not certain programs are deleted. For example, the subscriber can elect never to erase a program until the subscriber has manually erased the program. However, the subscriber can elect to flag a particular program (or groups of programs such as an entire series) to be automatically deleted if space is needed on the DVR 120 to record other programs. For example, if the DVR 120 is scheduled to record a new movie, but does not have the capacity to record the movie, the DVR 120 automatically deletes a program that has an associated "keep until" data field option that has been selected to be erased if space is needed for a new recording. In exemplary embodiments, the "keep until" field can further include a time limit field into which the subscriber can enter a time period after which the program is erased (for example, once space is needed or alternatively to be automatically erased after the selected time period). In further exemplary embodiments, additional fields can be selected to create a deletion or cancellation priority as further described with respect to FIG. 5. In exemplary embodiments, the interface 231 can further include a recording time field 239. In this way, the subscriber can choose to start and stop recording at the scheduled time or at a different time such as a specified number of minutes later. In this way, the subscriber can add time at the beginning and at the end of the recording to have a "pad" to ensure that the full program is recorded, for example, in the case of a delayed start.

FIG. 5 illustrates a screen shot of a DVR recordings user interface 251 in accordance with exemplary embodiments. As described above, the interface 200 includes multiple tabs (that are present in each interface to which the subscriber navigates) including the recordings tab 250 that, when navigated, displays the recordings interface 251. In exemplary embodiments, the interface 251 can display a list of programs 252 that the subscriber has recorded (or in the process of recording (e.g., an ongoing recording of a series) on the DVR 120. The interface 251 can further include as a series of descriptive columns 253 having information including title, channel and time recorded/running time. In exemplary embodiments, the interface 251 can include an indication of whether or not a program has been viewed. For example, the descriptive columns can include a "watched" indication, with a respective "YES" and "NO" next to a respective program. In exemplary embodiments, the list of programs 252 recorded onto the DVR 120 are displayed with the indication, which may be the "YES" and "NO" as described above, or a flag or any other type of indicator, of whether the program has been watched. In exemplary embodiments, the data field associated with the program is set to "watched" (e.g., "YES") once the recorded program has been played from start to finish.

Referring still to FIG. 5, the interface 251 can further include an edit button 253 for opening up a particular program listing for review and edit. The interface 251 can further include an erase button 254 to delete the program from the recordings interface 251. As described above, the subscriber can select to edit a program by pressing the edit button 253. When the subscriber presses the edit button 253, the program listing associated with the pressed edit button 253, expands to a viewing field similar to the viewing field as described with respect to FIG. 4. The viewing field can include information about the program such as description, actors, genre and other data. The viewing field can further include edit field options. The edit field options provides the subscriber with edit options such as managing ongoing series recording as described above. Furthermore, in exemplary embodiments, when the subscriber highlights a particular program, an informational screen similar to the informational screen 226 as illustrated in FIG. 3 can be displayed, which includes information about the selected program. In exemplary implementations, the information screen can be generated by loading the program data using a program that does not interfere with the loading of the interface 251 (e.g., asynchronous javascript and XML (AJAX)).

In exemplary embodiments, the subscriber can implement cancellation options and deletion priority options for the programs that have been viewed. As described above, in exemplary embodiments, the list of programs 252 recorded onto the DVR 120 are displayed with an indication, which may be a flag or any other type of indicator, of whether the program has been watched. In exemplary embodiments, a subscriber may schedule multiple recordings of the same program to be made to ensure that at least one recording of the desired program is successful. In exemplary embodiments, if a recorded program has been watched or viewed, future scheduled recordings of the same program (even if on a different channel) can be cancelled. In exemplary embodiments, the subscriber may customize the DVR options so that the default is to cancel such future recordings, such as via the preferences server 150. In exemplary embodiments, the subscriber may also be prompted after the user has finished watching the recorded program. For example, a notification can be displayed on the communications device 110 (or other device in which the recorded program is viewed). The DVR management and scheduling application 155 may search for all scheduled future recordings of the program the user has just watched, bring up a list of such programs, and provide a way for the user to cancel the future recordings (prompting, checkbox, other selection methods). For example, all scheduled recordings can be displayed on the recordings interface 251 with a corresponding edit button, such as the edit button 253, and erase button, such as the erase button 254. As such, only those recordings that are subject to the cancellation options are displayed on the recordings interlace 251. In exemplary embodiments, the subscriber may be prompted to cancel future recordings of the already watched program at or near the time in which the future recording is scheduled to be recorded. There may be an indication to the user that the program that is about to be recorded has already been viewed by the user, and the user may be presented with the option to continue to record or to cancel the recording.

With regard to deletion priority, as described above, In exemplary embodiments, the list of programs recorded onto the DVR 120 are displayed with the "watched" indication, which may be a flag or any other type of indicator, of whether the program has been watched. The data field associated with the program is set to "watched" once the recorded program has been played from start to finish. In exemplary embodiments, the setting of the field can be used to alter the priority of deletion of stored programs. In exemplary embodiments, the subscriber has the option to keep programs on the DVR 120 until space is needed. When space is needed, such designated programs can be deleted based on the date they were recorded (i.e., first in, first out). In exemplary embodiments, if a recorded program that is scheduled for deletion when space is needed has been watched, it is deleted before a program scheduled for deletion when space is needed that has not been watched, regardless of the date on which the programs are recorded. In exemplary embodiments, if two programs scheduled for deletion when space is needed have both been watched, then the system reverts back to deleting the one that has been recorded first (i.e., first in, first out). As described above, the subscriber can also edit a particular program to only be erased when the subscriber manually erases the program. As such, if there is a program that the subscriber wants to keep indefinitely, the subscriber can ensure that it is not erased even if space is needed. In exemplary embodiments, the subscriber can provision additional disk space if needed as described above.

Figure 6:
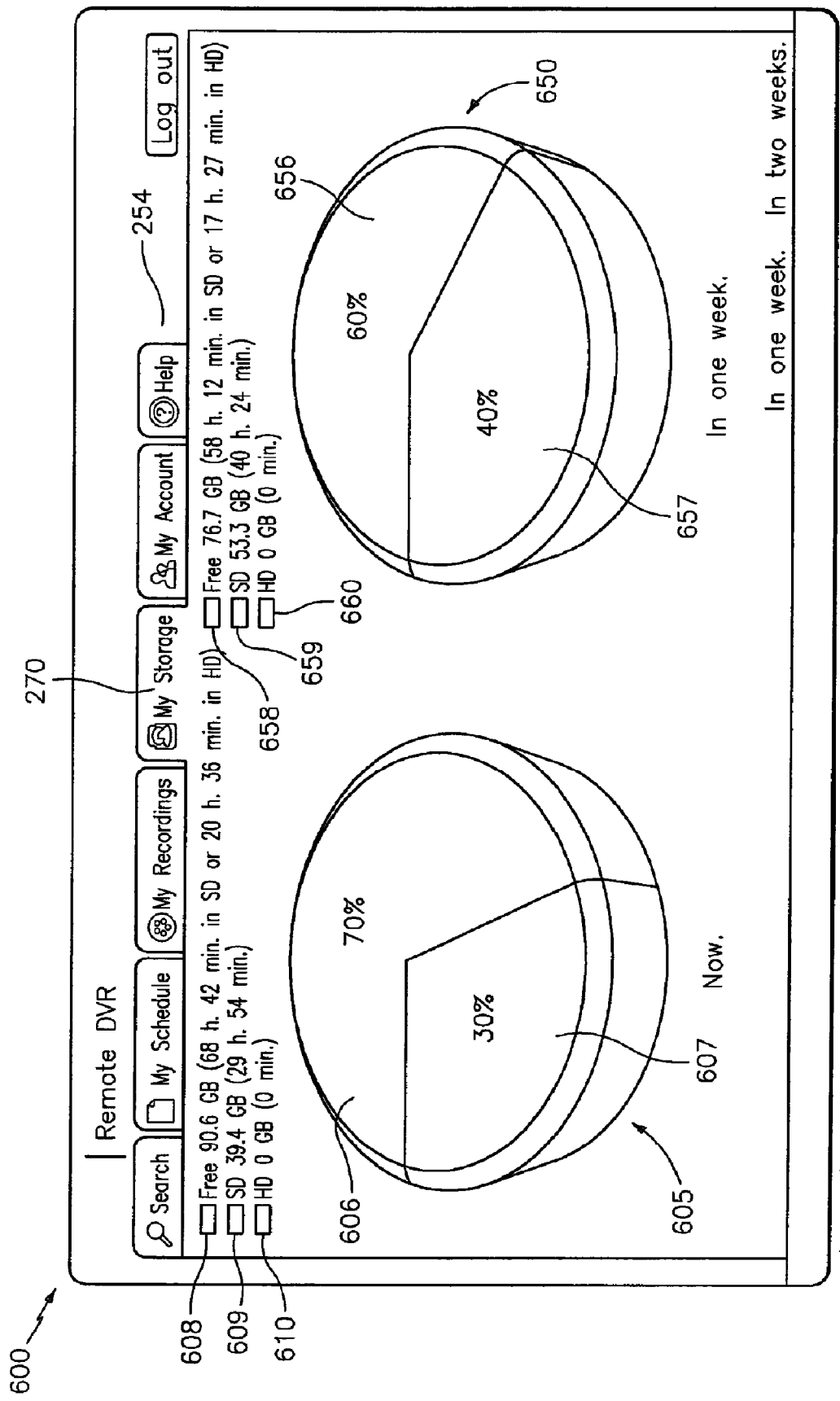
FIG. 6 illustrates a screen shot of a DVR storage capacity user interface in accordance with exemplary embodiments.

As described above, in exemplary embodiments, the subscriber can access an interface that graphically depicts storage available by content type (and other categories). FIG. 6 illustrates a screen shot of a DVR storage capacity user interface 600 in accordance with exemplary embodiments. The subscriber can navigate to the DVR storage capacity user interface 600 via the storage tab 270 as described with respect to FIG. 2 above. In exemplary embodiments, a pie chart 605 can be displayed to represent the capacity of the DVR 120. The pie chart 605 may depict, for example, the percentage of DVR storage space that is free (un-used) as illustrated by an un-used pie slice 606 (e.g. 70%). The pie chart 605 may also include a percentage of the DVR storage space that contains recorded material as illustrated by a used pie slice 607. The interface 600 may further break down the recorded material represented as the slices 606, 607 into a slice representing the percentage of the DVR capacity taken up by standard definition (SD) programs, and the pie chart may also include a slice that shows the viewer the percentage of DVR space taken up by high definition (I-ID) programs. Accordingly, the interface 600 can include legend entries 608, 609, 610, illustrating coding (e.g., color coding) for free space, SD space used, and HD space used respectively. The units may be expressed in terms of time (e.g., minutes), or space (e.g., percentage of total capacity).

In exemplary embodiments, if a subscriber selects "a slice", as discussed above, the screen on the appropriate display device (e.g., the communications device 110) can display the programs related to that slice. For example, if a subscriber selects the HD slice of the pie chart 605, the screen displays all of the recorded HD programs residing on the DVR 120. In exemplary embodiments, the screen that is displayed is similar to the recordings interface 251. Each program entry can include information such as program title, date recorded, channel or broadcast affiliation, and any other information.

In exemplary embodiments, the interface 600 can display a projected pie chart 650 that projects to some future period (e.g., one day later, or one week later, or one month later). In exemplary embodiments, the projected pie chart 650 represents the capacity of the DVR 120 if nothing else changes, i.e. presuming that the programs currently scheduled to be recorded (whether HD or SD) are recorded, and if programs scheduled for deletion (including rules-based deletion) are deleted. In exemplary embodiments, when a listing is presented to the subscriber, those programs that are scheduled for deletion can be highlighted or otherwise marked with an indicator, informing the subscriber that the programs are to be deleted. The deletion scheduling can be based on projections that space is to be needed based on the current scheduling. It is further appreciated that there are some programs that the subscriber has indicated to only be deleted when the subscriber manually deletes the programs. As such, the pie charts 606, 650 can further include slices indicating capacity dedicated to programs that are never to be deleted. Furthermore, if the subscriber selects the one or more of the slices for viewing as a list, the programs that are not to be deleted can further include an indicator such as all exclamation point or other symbol or highlighting indicating the programs that are not to be deleted. This visual indication alerts the subscriber as to those programs that the subscriber has indicated not to be erased. The subscriber can further select one of the programs to further edit the program, such as to allow it to be deleted.

In exemplary embodiments, similar to the pie chart 605, the interface 600 may further break down the recorded material represented as slices 656, 657 into a slice representing the percentage of the DVR capacity taken up by standard definition (SD) programs, and the pie chart may also include a slice that shows the viewer the percentage of DVR space taken up by high definition (HD) programs. In addition, the interface 600 can include legend entries 658, 659, 660, illustrating coding (e.g., color coding) for free space, SD space used, and HD space used respectively. The units may be expressed in terms of time (e.g., minutes), or space (e.g., percentage of total capacity). Accompanying the display of the projected pie chart 650 at a future period can be a list of the programs that are scheduled to be purged and a list of the future programs that are scheduled to be recorded, similar to the schedule interface 231.

In exemplary embodiments, it is appreciated that the subscriber location 105 may have multiple people who have different preferences set up for their respective accounts. It is further appreciated that the accounts can be linked. Since there may only be one DVR in the subscriber location 105, such as the DVR 120, the different account information can be compiled such that conflict resolution for multiple schedules in the subscriber location can be implemented across the accounts. Similarly, DVR capacity can also be calculated based on the multiple schedules in the subscriber location 105. Therefore, for deletion priority and cancellation options, it is appreciated that multiple users in the household may have recorded the same program, but only one may have actually viewed the program. Therefore, the deletion priority can be based further on sending a notification to all users of the subscriber location 105 who have either scheduled and/or recorded the same program. Therefore, deletion does not occur unless all users who have either scheduled and/or recorded the program have acknowledged that they have viewed it and agree that it is permissible to delete the program. Alternatively, the system 100 can track all users over multiple accounts to ensure that the multiple users have actually viewed the program before the program is deleted. It is therefore appreciated that the systems and methods described herein can be implemented across multiple users that are linked to a common account.

Figure 7:
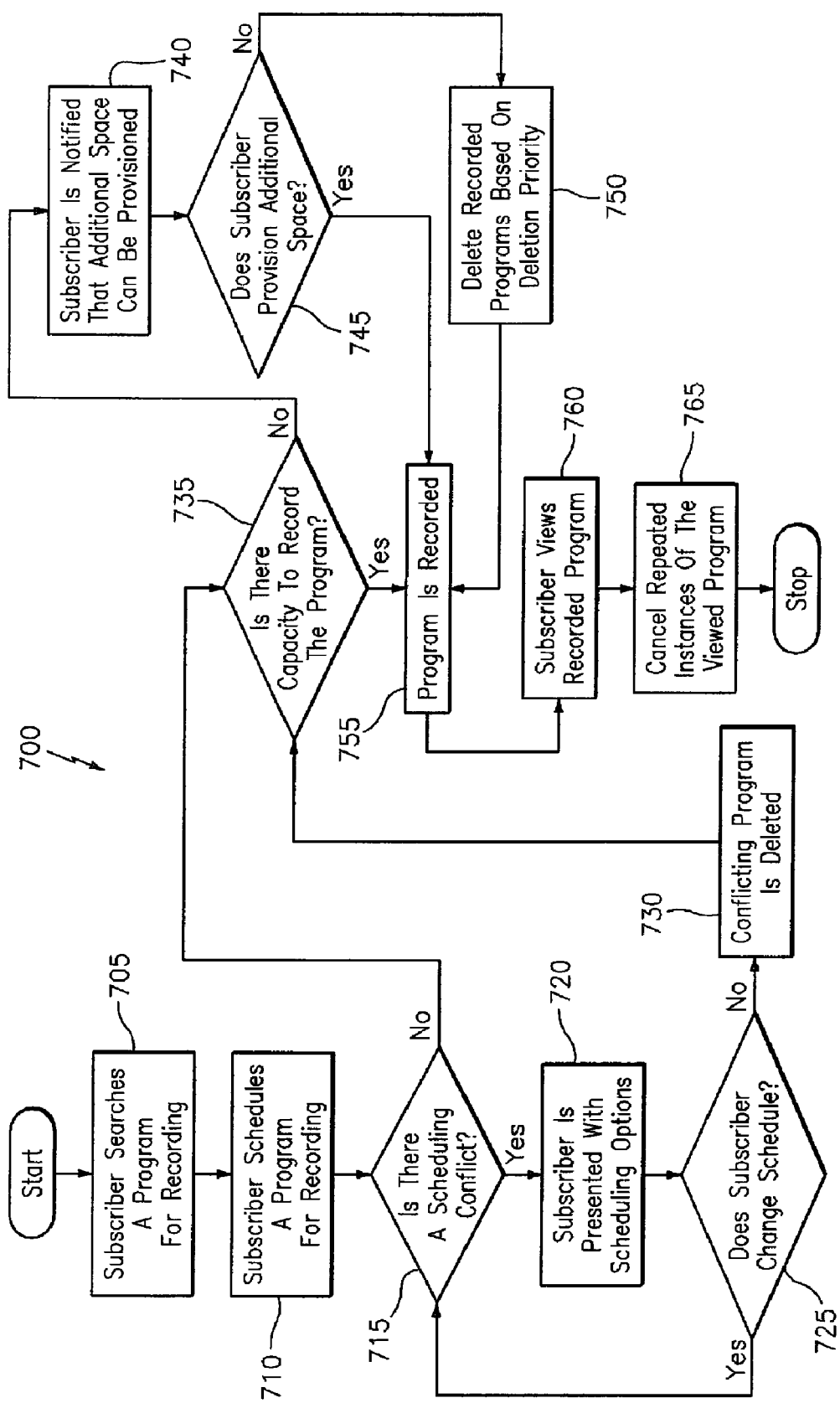
FIG. 7 illustrates a flowchart of an example of a DVR scheduling, deletion, cancellation and conflict resolution method in accordance with exemplary embodiments.

The systems and methods described herein illustrate exemplary embodiments of DVR scheduling and management services. FIG. 7 illustrates a flowchart of an example of a DVR scheduling, deletion, cancellation and conflict resolution method 700 in accordance with exemplary embodiments. In exemplary embodiments, the method 700 can be performed by the DVR management and scheduling services application 155. In exemplary embodiments, at step 705 the subscriber searches for a program for recording on the DVR 120. As described herein, the subscriber can search for a program via the EPG displayed on the communications device 110 and can navigate the EPG using the remote control 111. In exemplary embodiments, the search results can be displayed as discussed with respect to the search interface 200 as described with respect to FIG. 3. It is appreciated that the subscriber can search for a program via other suitable devices such as the device 117 and the subscriber computer 125. At step 710, the subscriber schedules a program for recording on the DVR 120. In exemplary embodiments, the subscriber's program selection is added to the schedule interface 231 as described with respect to FIG. 4. At step 715, the DVR management and scheduling services application 155 determines whether or not there is a scheduling conflict. As described above, in exemplary embodiments, if there is a scheduling conflict at step 715, then in accordance with exemplary embodiments, the subscriber is presented with several scheduling options at step 720. As described above, the scheduling options are selected by the DVR management and scheduling services application 155 according to the availability of other times and programs that may be available (e.g., via the EPG). At step 725, the DVR management and scheduling services application 155 determines whether the subscriber has changed the schedule in response to the scheduling conflict. If the subscriber does change the schedule, it is appreciated that the subscriber may change the schedule independent of the non-conflicting options selected by the DVR management and scheduling services application 155. As such, the DVR management and scheduling services application 155 determines again whether there is a scheduling conflict at step 715. If the subscriber does not change the schedule at step 725, then in exemplary embodiments, the DVR management and scheduling services application 155 deletes the prior scheduled conflicting program in order to accommodate the newly scheduled program at step 730. It is appreciated that the subscriber can set up a variety of preferences (e.g., via the preferences server 150) to be presented with different options in response to a continuing schedule conflict. For example, the subscriber can be sent a notification that the conflict still exists and be given the option to delete the prior scheduled conflicting program instead of the DVR management and scheduling services application 155 automatically deleting the conflicting program. In another example, the subscriber can be sent a notification that the prior scheduled conflicting program has been deleted and be given an option to be notified if the deleted program becomes scheduled (e.g., via the EPG) at a future date. At that time, when the deleted program becomes available (e.g., via the content services provider server 160), the IPTV gateway 145 can be on alert to send a notification to the subscriber location 105 that the program is once again available. It is appreciated that there are a variety of options that the subscriber can set up for notifications and scheduling options.

Referring still to FIG. 7 and returning to steps 715 and 730, if there is no scheduling conflict: at step 715 or once a program is deleted at step 730, the DVR management and scheduling services application 155 determines whether there is capacity on the DVR 120 to record the scheduled program at step 735. If there is no space available for recording the program on the DVR 120 at step 735, then, as described above, in exemplary embodiments, the subscriber can be given the option to provision additional space on the DVR 120. Therefore, at step 740, the subscriber is sent a notification that there is no more additional space to record on the DVR 120 and notified the subscriber that additional space can be provisioned. It is appreciated that in this example there is in fact space to unlock on the DVR 120. At step 745, the DVR management and scheduling services application 155 determines whether the subscriber has provisioned additional space. If at step 745, the subscriber does provision additional space then at step 755 the program is recorded (i.e., the program is scheduled and accordingly programmed at the time the program is made available). If at step 745, the subscriber chooses not to provision additional space, then at step 750, previously recorded programs are deleted based on the deletion priorities as set by the subscriber (see for example the "keep until" options field 238 of FIG. 4). In exemplary embodiments, the deletion priority applies to only programs that have been recorded and viewed. Once programs are deleted to make space available at step 750, then the program is scheduled and recorded at step 755.

Returning to step 735, if there is capacity to record the program then the program is recorded at step 755 as described above. At step 760, it is appreciated that the subscriber eventually views the program. Furthermore, in exemplary embodiments, at step 765 the DVR management and scheduling services application 155 cancels repeated instances of the recorded and viewed program. As described above, the subscriber may have scheduled the same program several times. Once the DVR management and scheduling services application 155 determines that the program has been recorded (and viewed), the repeated scheduled instances of the program can be deleted in order to prevent repetition of recorded shows and to conserve space on the DVR 120.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method, via a communication device with a graphical user interface including a display and a selection device, of providing and selecting from a graphical image on the display, the method comprising:
   retrieving by the communication device capacity data from a digital video recorder;
   translating the capacity data for display within the graphical image via the communication device; and
   displaying by the communication device the capacity data within the graphical image on the display;
   wherein the capacity data displays a pie chart displaying a first percentage of digital video recorder memory utilized for standard definition programs and a second percentage of the digital video recorder memory utilized for high definition programs; and
   wherein, for recording to the digital video recorder, the communication device is configured to display a first search option for only high definition programming, a second search option for only standard definition programming, and a third search option for both the high definition programming and the standard definition programming.

2. The method as claimed in claim 1, further comprising:
   receiving a selection signal indicative of the selection device pointing at a selected portion of the graphical image; and
   in response to the selection signal, performing a search of recorded programs on the digital video recorder; and
   presenting a list of the recorded programs on the display.

3. The method as claimed in claim 1, further comprising, in response to a recorded program being viewed by a user via the communication device, searching for scheduled future recordings of the recorded program viewed by the user in order to provide the user with a selectable option to cancel the future recording of the recorded program already viewed.

4. The method as claimed in claim 1 wherein the graphical image includes a section indicating unused space on the digital video recorder.

5. The method as claimed in claim 1 wherein the graphical image includes a section indicating used space on the digital video recorder.

6. A system, comprising:
   a processor;
   a communication device coupled to the processor;
   wherein the communication device is configured to retrieve capacity data from a digital video recorder, translate the capacity data for display within a graphical image, and display the capacity data within the graphical image on a display;
   wherein the capacity data displays a pie chart displaying a first percentage of digital video recorder memory utilized for standard definition programs and a second percentage of the digital video recorder memory utilized for high definition programs; and
   wherein, for recording to the digital video recorder, the communication device is configured to display a first search option for only high definition programming, a second search option for only standard definition programming, and a third search option for both the high definition programming and the standard definition programming.

7. The method of claim 1, further comprising cancelling digital video recorder programs, which comprises:
   receiving a request to record a program on the digital video recorder;
   receiving a notification that the program, being a recorded program, has been recorded;
   receiving another notification that the recorded program has been viewed;
   searching for an instance of the program in addition to the recorded program; and
   cancelling the instance of the program.

8. The method of claim 1, further comprising deleting digital video recorder programs, which comprises:
   receiving a request to record a program on the digital video recorder;
   determining recording capacity on the digital video recorder;
   deleting previously recorded programs stored on the digital video recorder; and
   recording the program on the digital video recorder.

9. The method of claim 1, further comprising providing schedule conflict resolution for the digital video recorder, which comprises:
   receiving a first recording request for a first program;
   receiving a second recording request for a second program;
   determining whether there is a scheduling conflict between the first and second recording requests; and
   presenting options to resolve the scheduling conflict.

10. The method of claim 1, further comprising scheduling programs on the digital video recorder, which comprises:
    receiving a request to record a program on the digital video recorder;
    retrieving programming data;
    searching for instances of the program within the programming data;
    retrieving a recording schedule; and
    determining schedule conflicts between the request to record the program and the recording schedule.

11. The method of claim 1, further comprising saving search criteria for a program for recording on the digital video recorder, which comprises:
    receiving the search criteria;
    retrieving programming data available for recording on the digital video recorder;
    sending a subset of the programming data matching the search criteria;

receiving a notification that the search criteria matches a preference; and storing the search criteria.

12. The method of claim 1, further comprising recovering digital video recorder content, which comprises:

retrieving the digital video recorder content from the digital video recorder; and transferring the digital video recorder content to a site remote to the digital video recorder.

13. The method of claim 1, further comprising providing digital video recorder provisioning, which comprises:

receiving a request to provision digital video recorder space on a storage medium residing on the digital video recorder; and unlocking space on the storage medium.

* * * * *